United States Patent [19]

Martin

[11] Patent Number: 5,269,592
[45] Date of Patent: Dec. 14, 1993

[54] HYDRAULIC RAMS

[75] Inventor: John C. Martin, Toronto, Canada

[73] Assignee: Diesel Equipment Limited, Toronto, Canada

[21] Appl. No.: 759,516

[22] Filed: Sep. 13, 1991

[51] Int. Cl.$^5$ ............................................. F01B 7/20
[52] U.S. Cl. .................................... 298/22 R; 92/52; 92/86
[58] Field of Search ................... 92/86, 52; 298/22 R

[56] References Cited

U.S. PATENT DOCUMENTS

| | | | |
|---|---|---|---|
| 2,364,741 | 12/1944 | Merchant | 92/86 X |
| 3,042,149 | 7/1962 | Comfort | 92/86 X |
| 3,934,423 | 1/1976 | Haller | 92/86 X |
| 4,326,739 | 4/1982 | Bender | 298/22 R |
| 4,759,257 | 7/1988 | Hund | 91/68 |
| 4,887,515 | 12/1989 | Tabata | 92/86 X |
| 5,033,794 | 7/1991 | Vick | 298/22 R |

FOREIGN PATENT DOCUMENTS

| | | | |
|---|---|---|---|
| 928447 | 5/1955 | Fed. Rep. of Germany | 298/22 R |
| 1289638 | 10/1969 | Fed. Rep. of Germany | |
| 825735 | 3/1938 | France | |
| 2068116 | 8/1971 | France | |
| 24252 | 1/1916 | United Kingdom | |
| 261212 | 1/1972 | United Kingdom | 298/22 R |

Primary Examiner—Michael S. Huppert
Assistant Examiner—Janice Krizek

[57] ABSTRACT

A hydraulic telescoping ram of the type suitable to tip dump trucks and the like, which permits the use of outer aggressive seals and a bore sealing device by providing a conduit which hydraulically connects the upper end of each cylinder of the telescopic ram with an oil reservoir. This makes it possible to use seals which are not aggressive and which can run on surfaces of somewhat less than top quality, on the internal bottom faces of the rams so as to allow the passage of a small quantity of oil into a gap formed within the ram and cylinder and between the aggressive and non-aggressive seals. The oil which passes the non-aggressive seal is returned to the oil reservoir when the ram is extended.

18 Claims, 4 Drawing Sheets

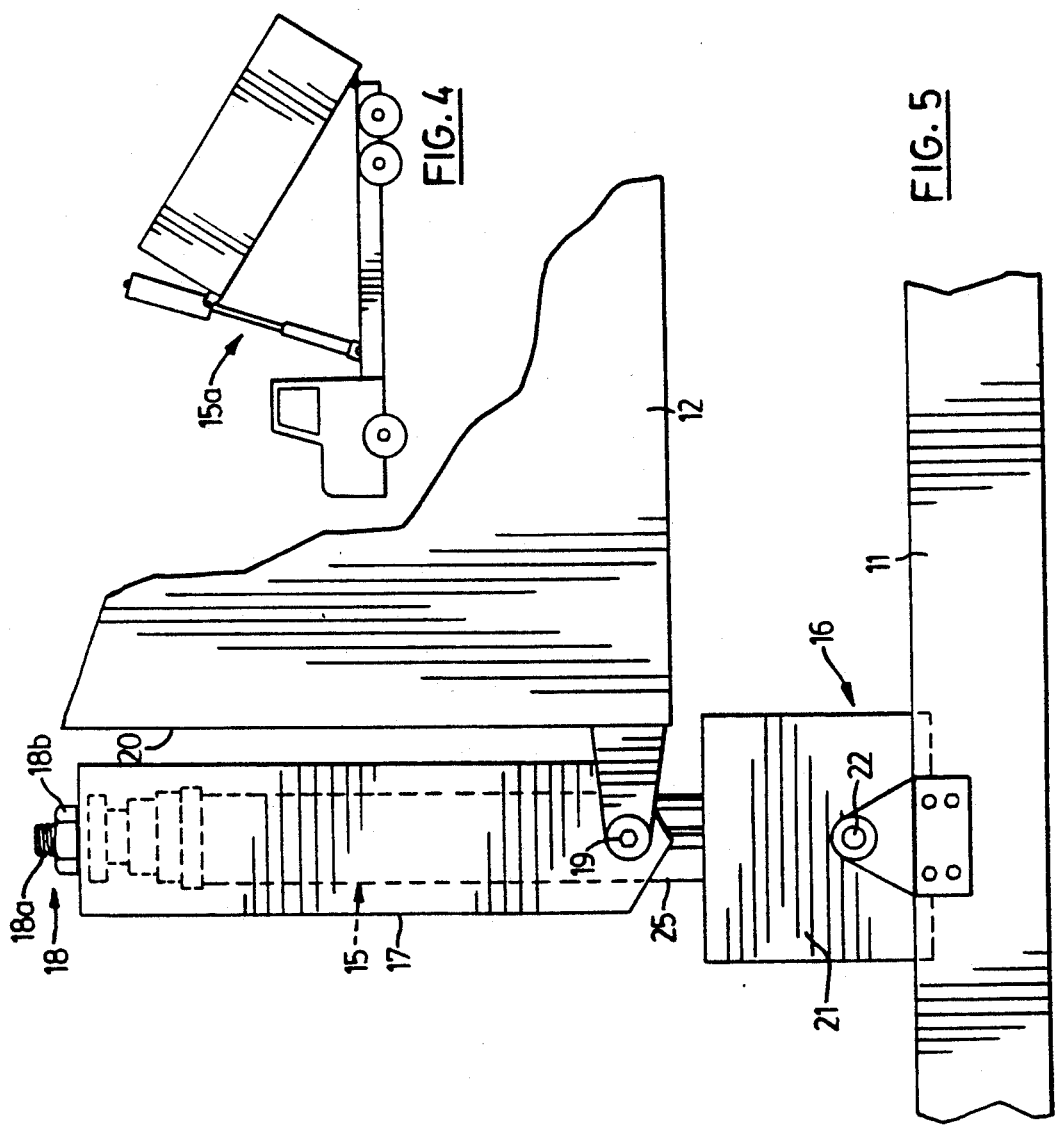

HYDRAULIC RAMS

BACKGROUND OF THE INVENTION

The present invention relates to hydraulic rams and has a particular application in the field of telescopic hydraulic rams used to operate dump trucks and the like.

There are two basic types of telescopic rams that are used for raising and lowering the body of a dump truck. The first type of ram is known generally in the art as a displacement sealing ram, or, a rod sealing system. In this type of device the telescoping rams and cylinders are sealed from each other by means of a stationary seal at the upper end of the cylinder of the larger ram and the seal occupies part of its cylinder. This results in the reduction of ram cross-sectional area against which hydraulic fluid may act thereby reducing the available exertable force for a given diameter ram. However, this type of sealing system provides the desirable feature that because each telescoping segment is submerged in oil when the ram is collapsed any tendency for the ram to rust is vigorously resisted. This system also permits the use of an aggressive seal which avoids evidence of leakage when the ram is extended. However, if the ram is scored or otherwise damaged the aggressive seal may be reduced, or destroyed, although this drawback is somewhat mitigated because the sealing surfaces are readily inspected and their condition and the good surface finish of the rams can be readily observed.

The second type of sealing that is commonly used is the so-called "bore" sealing system. In this structure, a seal in the form of a cup is located at the lower end of each segment of ram that is to be extended. This type of system has the advantage that the moveable ram can have an active cross-sectional area which is very close to the area of the cylinder in which the ram fits, thereby maximizing the available hydraulic force for lifting purposes. Another advantage of this system, is that the non-aggressive seals can run on ram tube surface finishes that are not as demanding as those required for the displacement seal. On the other hand this system has the drawback that the seals separate the successive segments from the hydraulic oil in the chamber in which the ram segment is telescoped, with the result that the segments are not oiled to prevent rust if the seals are designed aggressively. To overcome this drawback the seals are generally designed to be non-aggressive, that is to say they are designed to permit a certain amount of oil to escape past the seal so as to lubricate the ram. However the escaped (lubricating) oil accumulates when the ram is collapsed and thereafter, when the ram is again extended after its collapse for some time, the accumulated oil spills out giving the impression that the seal may have failed. Thus although the sealing surfaces in this system are not as prone to damage as in the first discussed system, they are not readily examined and consequently, it is difficult to ascertain whether the observed spilled oil is a result of the telescoping action, or, the result of a seal having failed.

SUMMARY OF THE INVENTION

The present invention relates to a system which permits the use of aggressive seals and a bore sealing device and accordingly, the present invention provides a telescoping hydraulic ram device comprising an elongate first cylinder and a first ram reciprocally mounted therein; a longitudinally extending conduit means external to said first cylinder and said first ram connected to a reservoir and providing a non-fluid trapping path; a bore seal at an inner end of said first ram non-aggressively sealing said inner end with the inner wall of said first cylinder; an annular seal at the outer end of said first cylinder, circumferentially engaging and aggressively sealing said first cylinder with said first ram and providing, with said bore seal, a first longitudinally extending circumferential space between said first cylinder and first ram; a first oil port in operative communication with said first space adjacent to and inboard of said annular seal and with said conduit means to provide two-way communication between said first space and said conduit means, to permit the egress to a reservoir of oil trapped in said first space when said first ram is extended; said first ram forming a second cylinder in which a second ram is reciprocally mounted; a second bore seal at an inner end of sad second ram non-aggressively sealing the inner end of the second ram with the inner wall of said second cylinder; a second annular seal at the outer end of said second cylinder, circumferentially engaging and aggressively sealing said second cylinder with said second ram and providing, with said second bore seal, a second longitudinally extending circumferential space between said second cylinder and said second ram; and a second oil port in operative communication with said second space adjacent to, and inboard of, said second annular seal and with said conduit means to provide two-way communication between said second space and said conduit means, to permit the egress to a reservoir of oil trapped in said second space when said second ram is extended.

According to a preferred feature of the invention the port is connected to the reservoir, externally of the first cylinder by a longitudinally extending first conduit and the second port is connected to the reservoir externally of the first and second cylinders by a second longitudinally extending conduit telescopically mounted within the first conduit.

According to a further feature of the invention a rectangular cross-section cover is provided to substantially envelop the rams, cylinders and conduits when the device is in the fully retracted condition. In a preferred application of the device, it is operatively mounted at its inner end to a supporting chassis, such as a truck chassis and at its outer end to a point adjacent the bottom of the front wall of a cargo carrying dumping body such as that of a dump truck.

As desired further cylinders, ram, seals providing spaces, ports and telescopically mounted conduits therefor, may be serially arranged according to the nature of the application of the invention.

BRIEF DESCRIPTION OF THE DRAWINGS

The following is a description by way of example of one embodiment of the present invention, reference being had to the accompanying drawings in which:

FIG. 4 is a detail, in side elevation, of the ram of FIG. 1 in its retracted state; and FIG. 5 is a side pictorial representation of the ram of FIG. 2 in extended form.

DETAILED DESCRIPTION OF THE PREFERRED EMBODIMENT

Figure 1:
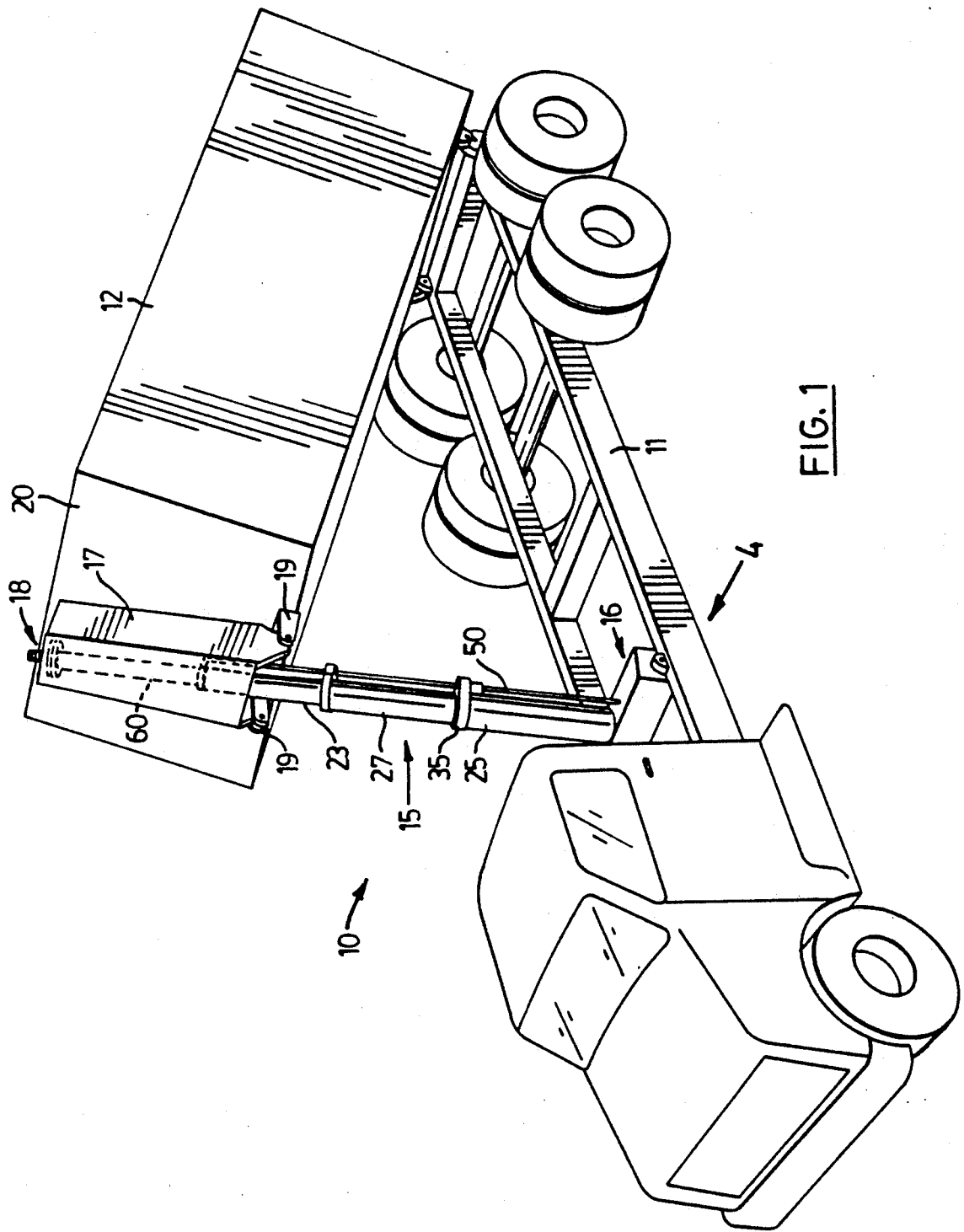
FIG. 1 is a pictorial view of a telescoping ram made in accordance with this invention as applied to a dump truck.

Turning now to FIGS. 1 and 4 of the drawings. A dump truck, generally indicated at 10, has a wheel mounted chassis 11 and a tipping cargo carrying body 12 pivotally mounted in conventional fashion on the rear of the chassis 11. A multistage telescoping hydraulic ram is generally indicated at 15 and is mounted at its bottom, or inner, end 16 to the truck chassis 11 and at its outer end 18 to a cover 17 which is, in turn, connected to a pivot point 19 adjacent the bottom of the front wall 20 of the cargo carrying body 12 of the dump truck. The attachments at the chassis point and the body point 19 may be in any suitable form and preferably, though not at all necessarily, the connection at 16 may be via a reservoir box 21 pivotally mounted at pivots 22 on the chassis 11, as is known in the art.

Figure 2:
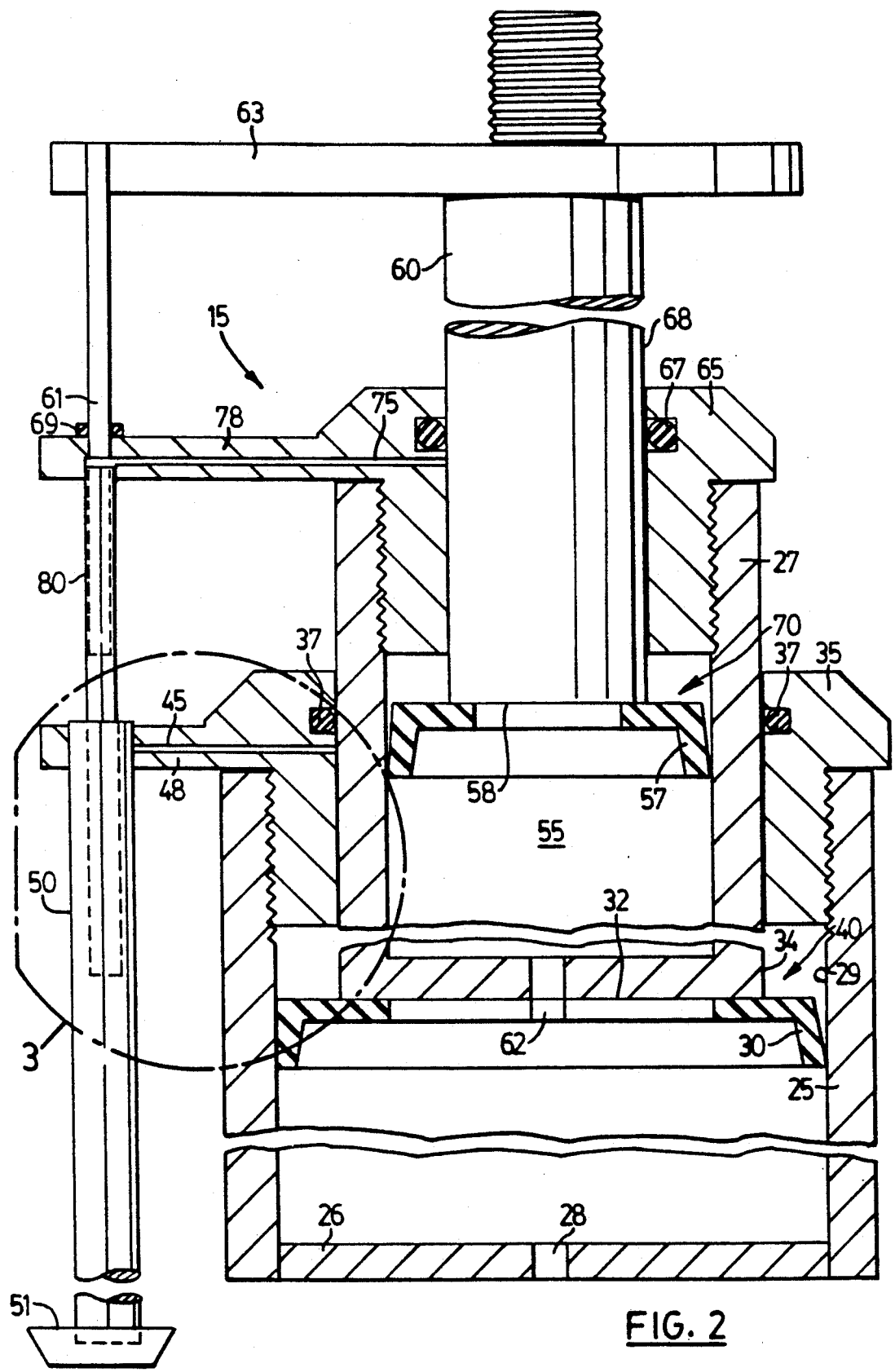
FIG. 2 is schematic sectional view of a telescoping hydraulic ram made in accordance with this invention.

Turning now to FIGS. 2 and 5. A telescoping hydraulic ram 15a has a first cylinder 25 which is pivotally connected to the truck chassis, or to whatever other element is desired, in conventional fashion at its lower end 26. A ram 27 is reciprocally mounted in the cylinder 25. Hydraulic pressure to the cylinder 25 and exhaust to tank therefrom, is provided in conventional fashion, here schematically illustrated by the bore hole 28. A cup-like bore seal 30 is provided at the inner end 32 of the ram 27. The seal is attached in conventional fashion to the ram 27. The seal 30 provides the advantage of a large active area by which force may be exerted on the ram 27.

Screwed into the top of cylinder 25 is an outer end cap 35 forming part of cylinder 25 and carrying an annular seal 37 circumferentially engaging the ram 27 and aggressively sealing the cylinder 25 with the ram 27. This aggressive sealing permits little or no leakage past the seal 37 when the ram 27 reciprocates in the cylinder 25. The seal 37 provides, with the cup-like bore seal 30, a longitudinally extending circumferential space 40 between the inner wall 29 of cylinder 25 and the outside surface 34 of the ram 27. Since the cup-like bore seal 30 non-aggressively seals the ram 27 in the cylinder 25, that is to say it permits a certain amount of leakage or seepage from cylinder 25 into space 40, oil will be trapped in the space 40 when the ram 27 is extended. To permit egress of the trapped oil from the space 40 a port, schematically shown at 45, operatively communicates the space 40 to the outside of the cylinder 25. The port 45 is inboard of the seal 37 and is continuous through a tab flange 48 on the cap 35 and is in fluid communication with a conduit 50 which returns the oil to reservoir, or tank, 51. Preferably this tank is the same tank which provides the oil for actuation of the hydraulic ram.

The ram 27, in its turn, provides therewithin, a cylinder 55 which is a duplicate, of smaller diameter, of the cylinder 25. A second cup-like bore seal 57 similar to the seal 30 but of smaller diameter is attached to the lower end 58 of ram 60 which is reciprocally mounted in cylinder 55, in a fashion which duplicates the manner of the ram 27 in the cylinder 25.

Again operating fluid is provided to cylinder 55, and evacuated therefrom, in conventional fashion and is here schematically shown by means of an aperture 62 through the bottom of ram 27 and seal 30. At the outer end of ram 27 (which forms cylinder 55), a screw-threaded end cap 65 is provided. In its turn, a second annular seal 67 is provided at the outer end of the cylinder 55 in the end cap 65 and circumferentially engages the outer surface 68 of the ram 60. A second longitudinally extending circumferential space 70 is provided by aggressive seal 67 and non-aggressive seal 57, between the cylinder 55 and the second ram 60.

Again, because seal 57 non-aggressively seals with the walls of cylinder 27, oil is leaked into the space 70 when the ram 60 is extended and this oil is trapped in space 70. A second port 75 is positioned adjacent to and inboard of the second aggressive annular seal 67 and permits egress of the trapped oil from the space 70. As before, the port 75 extends within an extended tab flange 78 on the member 65 and it terminates in a second conduit 80 which is telescopically arranged within conduit 50 in a fashion which will be described more fully hereinafter.

Thus, as pressure is admitted through the aperture 28 to extend the telescoping ram 27 in the cylinder 25, the space 40 is vented and leaked oil is returned to tank 51. In its turn, as activating oil is admitted through aperture 62 into cylinder 55 to extend the ram 60, the space 70 is vented by means of port 75 and conduit 80, back to tank. Since the conduit 50 ends above the level of the oil in the reservoir, when the hydraulic rams are collapsed, or retracted, clean air is returned from the reservoir via conduit 50 and port 45 to space 40 and via conduit 80 and port 75 to space 70.

Thus the device combines major advantages of the bore sealing cylinder type of ram with major advantages of the displacement sealing type of ram.

A support arm 61 depends from a lateral projection 63 from the ram 60. The support arm extends through tab flange 78 and into conduit 80. An outside oil scrapper seal 69 prevents arm 61 from drawing oil out of the conduit. With this arrangement, the support arm assists in stabilising rams 27 and 60.

Although only two cylinders, rams and telescoping conduits have been illustrated in FIG. 2, it will be understood that three or four, or as many as desired, sections of cylinder, ram and telescoping conduits may be provided. In this regard, it is noted that FIGS. 1 and 4 show a telescoping hydraulic ram with three cylinders, rams and telescoping conduits. In FIG. 1, like parts to telescoping hydraulic ram 15a of FIG. 2 have been given like reference numerals, with the additional ram (cylinder) of FIG. 1 illustrated at 23. It will also be understood that the longitudinal scale of the cylinder and ram in FIG. 2 has been foreshortened.

Figure 3:
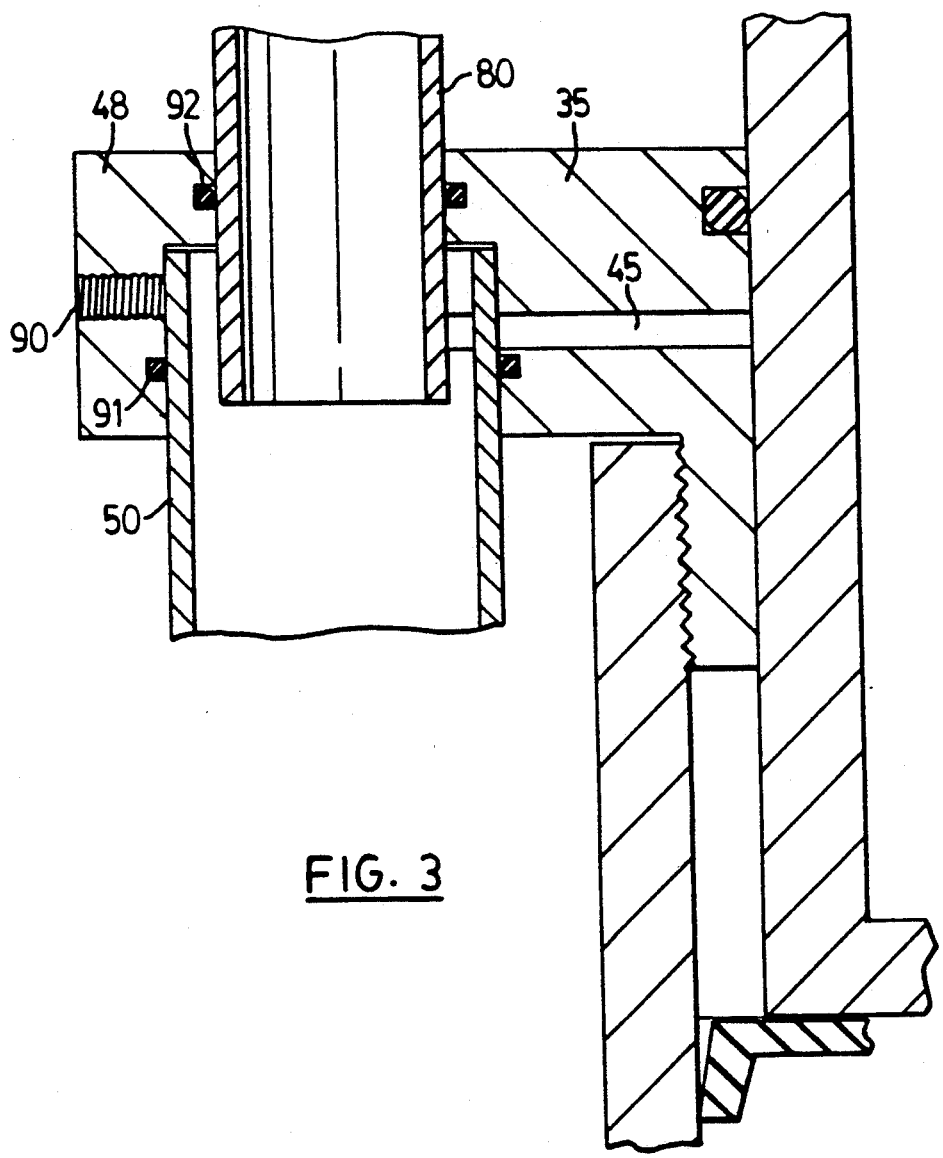
FIG. 3 is a part schematic detail of the area encircled on the left hand side of FIG. 2.

Turning now to FIG. 3, this shows the encircled area in FIG. 2 in more detail, although it will be understood that the FIG. 3 is still schematic. As will be seen, the first conduit 50 is locked into the tab flange 48 of the member 35 by means of a lock screw 90. The conduit 50 is sealed in the tab flange 48 by means of passive seals 91, shown here as an O-ring, and the second conduit 80 is moveable within the tab flange 48 so that it can telescope freely into the first conduit 50. The conduit 80 is sealed within the tab flange 48 by means of active seals 92, here again shown as O-rings. The clearance between the second conduit 80 and the first conduit 50 is such that the passage of the conduit 80 within the conduit 50 does not obscure egress of oil to the reservoir 51 via the port 45.

Obviously the flange tab 78 could receive and reciprocally seal a third conduit in the same fashion as shown in FIG. 3, and so on.

In the embodiment shown in FIG. 4, the hollow rectangular cross-section ram cover 17 is attached at its top to the top 18 of the ram 60 by suitable means such as threaded shaft 18a of ram 60 and nut 18b. The cover 17 has sufficient space at its corners to accommodate the conduits so that when the ram is collapsed the conduits and ram will be protected by the cover 17.

Although the invention has been described in an application to a dump truck, it will be understood that it will have other applications, for example to a dumping trailer, or indeed farther afield as will be understood by those skilled in this art.

Furthermore, although the preferred connection of ram through cover 17 to pivot points 19 on wall 20 has been shown, it will be understood that a simple eye to eye connection could be provided between ram and cargo body 12.

We claim:

1. A telescoping hydraulic ram device comprising an elongate first cylinder and a first ram reciprocally mounted therein; a longitudinally extending conduit means external to said first cylinder and said first ram connected to a reservoir and providing a non-fluid trapping path; a bore seal at an inner end of said first ram non-aggressively sealing said inner end with the inner wall of said first cylinder; an annular seal at the outer end of said first cylinder, circumferentially engaging and aggressively sealing said first cylinder with said first ram and providing, with said bore seal, a first longitudinally extending circumferential space between said first cylinder and first ram; a first oil port in operative communication with said first space adjacent to and inboard of said annular seal and with said conduit means to provide two-way communication between said first space and said conduit means, to permit the egress to said reservoir of oil trapped in said first space when said first ram is extended; said first ram forming a second cylinder in which a second ram is reciprocally mounted; a second bore seal at an inner end of said second ram non-aggressively sealing the inner end of the second ram with the inner wall of said second cylinder; a second annular seal at the outer end of said second cylinder, circumferentially engaging and aggressively sealing said second cylinder with said second ram and providing with said second bore seal, a second longitudinally extending circumferential space between said second cylinder and said second ram; and a second oil port in operative communication with said second space adjacent to, and inboard of, said second annular seal and with said conduit means to provide two-way communication between said second space and said conduit means, to permit the egress to said reservoir of oil trapped in said second space when said second ram is extended.

2. A device as claimed in claim 1 in which said conduit means comprises a longitudinally extending first conduit connecting said first port to said reservoir and a second longitudinally extending conduit telescopically mounted within said first conduit connecting said second port to said reservoir.

3. A device as claimed in claim 2 wherein said first port and said second port are positioned above said reservoir and said first conduit terminates at said reservoir above the level of oil in said reservoir, whereby, when said first ram and said second ram are collapsed, clean air is returned from said reservoir to said first longitudinally extending circumferential space and said second longitudinally extending circumferential space via said first conduit and said second conduit.

4. A device as claimed in claim 3 operatively mounted at an inner end to a supporting chassis and at an outer end to a point adjacent the bottom of the front wall of a cargo carrying dumping body.

5. A device as claimed in claim 3 in which additional cylinders, rams, seals providing spaces, ports and conduits therefor, are serially arranged.

6. A device as claimed in claim 3 including an extension proximate an outer end of said second ram terminating in an arm telescopingly mounted within said second conduit for stabilising said second ram.

7. A device as claimed in claim 6 including an oil scraper seal mounted at an end of said second conduit through which said arm is received, said scraper seal for scraping oil from said arm when said arm is extended from said second conduit.

8. A device as claimed in claim 1 wherein said first port and said second port are positioned above said reservoir and said conduit means terminates at said reservoir above the level of oil in said reservoir, whereby, when said first ram and said second ram are collapsed, clean air is returned from said reservoir to said first longitudinally extending circumferential space and said second longitudinally extending circumferential space via said conduit means.

9. A device as claimed in claim 8 in which said second ram forms a third cylinder in which a third ram is reciprocally mounted, a third bore seal and a third annular seal providing a third longitudinally extending circumferential space ported to said conduit means by a third port to permit egress of oil from said third port.

10. A device as claimed in claim 9 in which said first port is connected to said reservoir externally of said first cylinder by a longitudinally extending first conduit, said second port is connected to said reservoir, externally of said first and second cylinders by a second longitudinally extending conduit telescopically mounted within said first conduit; and said third port is connected to said reservoir, externally of said first, second and third cylinders by a third longitudinally extending conduit telescopically mounted within said second conduit.

11. A device as claimed in claim 10 including an extension proximate an outer end of said third ram terminating in an arm telescopically mounted within said third conduit for stabilising said third ram.

12. A device as claimed in claim 11 including an oil scraper seal mounted at an end of said third conduit through which said arm is received, said scraper seal for scraping oil from said arm when said arm is extended from said third conduit.

13. A telescopic hydraulic ram device as claimed in claim 8 wherein said first bore seal, said second bore seal and said third bore seal are cup-like.

14. A telescoping hydraulic ram device for a dump truck comprising an upstanding elongate first cylinder having an inside wall, an upper end, and a lower end, a first ram reciprocally mounted in said first cylinder; an upstanding conduit means external to said first cylinder and first ram providing a non-fluid trapping path, said conduit means for connection to a reservoir; a bore seal at a lower end of said first ram non-aggressively sealing said lower end of said first ram with said inside wall of said first cylinder; an annular seal proximate the upper end of said first cylinder circumferentially engaging and aggressively sealing said inside wall of said first cylinder with said first ram and providing, with said bore seal, a longitudinally extending first circumferential space between said first cylinder and said first ram; a first oil port in operative communication with said first space proximate and below said annular seal and with said upstanding conduit means, said first oil port providing two-way communication between said first space and said conduit means to permit the egress to a reservoir of oil trapped in said first space when said first ram is extended; said first ram forming a second cylinder having an upper end, a lower end, and an inside wall; a second ram reciprocally mounted in said second cylinder; a second bore seal at an inner end of said second ram non-aggressively sealing the inner end of the second ram with said inside wall of said second cylinder; a second annular seal at the upper end of said second cylinder, circumferentially engaging and aggressively sealing said inside wall of said second cylinder with said second ram and providing, with said second bore seal, a second longitudinally extending circumferential space between said second cylinder and said second ram; and a second oil port in operative communication with said second space proximate and below said second annular seal and with said upstanding conduit means, said second oil port providing two-way communication between said second space and said conduit means to permit the egress to a reservoir of oil trapped in said second space when said second ram is extended.

15. A device as claimed in claim 14 wherein said conduit means comprises a longitudinally extending first conduit operatively connected to said first port and as second longitudinally extending conduit telescopically mounted within said first conduit operatively connected to said second port.

16. A device as claimed in claim 15 including an extension proximate an outer end of said second ram terminating in an arm telescopically mounted within said second conduit for stabilising said second ram.

17. A device as claimed in claim 16 including an oil scraper seal mounted at an end of said second conduit through which said arm is received, said scraper seal for scraping oil from said arm when said arm is extended from said second conduit.

18. A telescoping hydraulic ram device for a dump truck comprising an elongate first cylinder and a first ram reciprocally mounted therein; a bore seal at an inner end of said first arm non-aggressively sealing said inner end with the inner wall of said first cylinder; an annular seal at the outer end of said first cylinder, circumferentially engaging and aggressively sealing said first cylinder with said first ram and providing, with said bore seal, a longitudinally extending circumferential space between said first cylinder and first ram; a first oil port in operative communication with said space adjacent to and inboard of said annular seal, to permit the egress to a reservoir of oil trapped in said space when said first ram is extended; said first ram forming a second cylinder in which a second ram is reciprocally mounted; a second bore seal at an inner end of said second ram non-aggressively sealing the inner end of the second ram with the inner wall of said second cylinder; a second annular seal at the outer end of said second cylinder, circumferentially engaging and aggressively sealing said second cylinder with said second ram and providing, with said second bore seal, a second longitudinally extending circumferential space between said second cylinder and said second ram; and a second oil port in operative communication with said second space adjacent to, and inboard of, said second annular seal, to permit the egress to said reservoir of oil trapped in said second space when said second ram is extended and in which said first port is connected to said reservoir externally of said first cylinder by a longitudinally extending conduit means, and said second port is connected to said reservoir, externally of said first and second cylinders, by said longitudinally extending conduit means, aid first port and said second port being positioned above said reservoir, said conduit means providing a non-fluid trapping path to said reservoir and terminating above the level of any oil in said reservoir, said first port permitting two-way communication with said conduit means and said second port permitting two-way communication with said conduit means, whereby, when said first ram and said second ram are collapsed, clean air is returned from said reservoir to said longitudinally extending circumferential space and said second longitudinally extending circumferential space.

* * * * *

UNITED STATES PATENT AND TRADEMARK OFFICE
CERTIFICATE OF CORRECTION

PATENT NO. : 5,269,592
DATED : December 14, 1993
INVENTOR(S) : John C. Martin

It is certified that error appears in the above-identified patent and that said Letters Patent is hereby corrected as shown below:

column 6, line 54, delete "8" and insert --9--.

column 8, line 32, delete "aid" and insert --said--.

Signed and Sealed this

Twenty-sixth Day of April, 1994

Attest:

BRUCE LEHMAN

Attesting Officer     Commissioner of Patents and Trademarks